(12) United States Patent
Oji

(10) Patent No.: US 11,837,700 B2
(45) Date of Patent: Dec. 5, 2023

(54) ENERGY STORAGE DEVICE

(71) Applicant: GS Yuasa International Ltd., Kyoto (JP)

(72) Inventor: Katsuya Oji, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 427 days.

(21) Appl. No.: 15/734,177

(22) PCT Filed: Jun. 4, 2019

(86) PCT No.: PCT/JP2019/022175
§ 371 (c)(1),
(2) Date: Dec. 1, 2020

(87) PCT Pub. No.: WO2019/235476
PCT Pub. Date: Dec. 12, 2019

(65) Prior Publication Data
US 2021/0167425 A1    Jun. 3, 2021

(30) Foreign Application Priority Data

Jun. 7, 2018 (JP) .................... 2018-109250

(51) Int. Cl.
*H01M 10/0587* (2010.01)
*H01G 9/02* (2006.01)
(Continued)

(52) U.S. Cl.
CPC .......... *H01M 10/0587* (2013.01); *H01G 9/02* (2013.01); *H01G 9/048* (2013.01);
(Continued)

(58) Field of Classification Search
CPC ......... H01M 10/0587; H01M 10/0431; H01M 10/0525; H01M 2220/20; H01G 9/02; H01G 9/048
(Continued)

(56) References Cited

U.S. PATENT DOCUMENTS

| | | | |
|---|---|---|---|
| 2005/0003264 A1* | 1/2005 | Oh ..................... | H01M 4/13 429/211 |
| 2005/0042516 A1 | 2/2005 | Oh et al. | |

(Continued)

FOREIGN PATENT DOCUMENTS

| | | | |
|---|---|---|---|
| JP | 2002-343420 A | 11/2002 | |
| JP | 2003-109869 A | 4/2003 | |

(Continued)

OTHER PUBLICATIONS

International Search Report (ISR) (PCT Form PCT/ISA/210), in PCT/JP2019/022175, dated Jul. 30, 2019.

*Primary Examiner* — Cynthia H Kelly
*Assistant Examiner* — Omar M Kekia
(74) *Attorney, Agent, or Firm* — McGinn I.P. Law Group, PLLC

(57) ABSTRACT

An energy storage device includes an electrode assembly having a negative electrode plate and a separator wound around a tubular core material. The core material has a first line part and a second line part extending along a first imaginary line and a second imaginary line parallel to a long side surface of a case, respectively. At least one of the first line part and the second line part has a curved portion that protrudes toward the other beyond the first imaginary line or the second imaginary line. An inner peripheral edge of the negative electrode plate is located at a position other than the curved portion in at least one of the first line part and the second line part.

19 Claims, 6 Drawing Sheets

(51) Int. Cl.
*H01G 9/048* (2006.01)
*H01M 10/04* (2006.01)
*H01M 10/0525* (2010.01)

(52) U.S. Cl.
CPC .... *H01M 10/0431* (2013.01); *H01M 10/0525* (2013.01); *H01M 2220/20* (2013.01)

(58) Field of Classification Search
USPC .......................................................... 429/94
See application file for complete search history.

(56) References Cited

U.S. PATENT DOCUMENTS

| | | | |
|---|---|---|---|
| 2009/0297931 A1 | 12/2009 | Oh et al. | |
| 2009/0297932 A1 | 12/2009 | Oh et al. | |
| 2010/0000078 A1 | 1/2010 | Oh et al. | |
| 2011/0129707 A1* | 6/2011 | Ahn | H01M 10/02 |
| | | | 429/94 |
| 2013/0011707 A1* | 1/2013 | Tsutsumi | H01M 10/0431 |
| | | | 429/94 |
| 2013/0011708 A1 | 1/2013 | Ueki et al. | |
| 2013/0071712 A1 | 3/2013 | Sasaki | |
| 2013/0244072 A1 | 9/2013 | Miyazaki et al. | |
| 2015/0086821 A1 | 3/2015 | Watanabe et al. | |
| 2019/0260088 A1 | 8/2019 | Oki et al. | |

FOREIGN PATENT DOCUMENTS

| | | |
|---|---|---|
| JP | 2003-242970 A | 8/2003 |
| JP | 2005-063939 A | 3/2005 |
| JP | 2011-077384 A | 4/2011 |
| JP | 2013-161755 A | 8/2013 |
| JP | 2017-027681 A | 2/2017 |
| JP | 2017-027950 A | 2/2017 |
| WO | WO 2011/118032 A1 | 9/2011 |
| WO | WO 2011/148866 A1 | 12/2011 |
| WO | WO 2012/004886 A1 | 1/2012 |
| WO | WO 2013/164916 A1 | 11/2013 |
| WO | WO 2018/012465 A1 | 1/2018 |

* cited by examiner

ENERGY STORAGE DEVICE

TECHNICAL FIELD

The present invention relates to an energy storage device including an electrode assembly having an electrode plate and a separator wound therearound.

BACKGROUND ART

Patent Document 1 discloses a battery that has a foil-shaped positive electrode plate and a foil-shaped negative electrode plate wound around a winding core with a separator sandwiched between them, and has a power generating element formed in a flat shape. In this battery, the winding core is made of a porous member, and the foil-shaped positive electrode plate and the foil-shaped negative electrode plate are arranged in a state where their respective surfaces on which active material layers are formed face each other while sandwiching the winding core therebetween, on the innermost circumference of the winding. With this configuration, the foil-shaped positive electrode plate and the foil-shaped negative electrode plate function as a battery also on the innermost circumference of the power generating element.

PRIOR ART DOCUMENT

Patent Document

Patent Document 1: WO 2011/148866 A1

SUMMARY OF THE INVENTION

Problems to be Solved by the Invention

The core material included in the power generating element in the conventional battery has flexibility. Therefore, there is a possibility that a gap may be generated between the edge of the electrode plate and the separator, and if a conductive foreign substance (contamination) such as a metal piece or metal powder enters the gap, a problem such as a slight short circuit may occur.

The present invention, in consideration of the above-mentioned conventional problem, has an object to provide a highly reliable energy storage device, which is an energy storage device including an electrode assembly having an electrode plate and a separator wound therearound.

Means for Solving the Problems

The energy storage device according to one aspect of the present invention is an energy storage device including an electrode assembly having a tubular core material and an electrode plate and a separator wound around the core material, in which when viewed from a direction of a winding axis of the electrode assembly, the core material has a first line part and a second line part extending along a first imaginary line and a second imaginary line parallel to a long side surface of a case of the energy storage device, respectively, at least one of the first line part and the second line part has a curved portion that protrudes toward the other beyond the first imaginary line or the second imaginary line, and an inner peripheral edge of the electrode plate at a winding start position is located at a position other than the curved portion in at least one of the first line part and the second line part.

Advantages of the Invention

According to the present invention, it is possible to provide a highly reliable energy storage device, which is an energy storage device including an electrode assembly having an electrode plate and a separator wound therearound.

MODE FOR CARRYING OUT THE INVENTION

Figure 1:
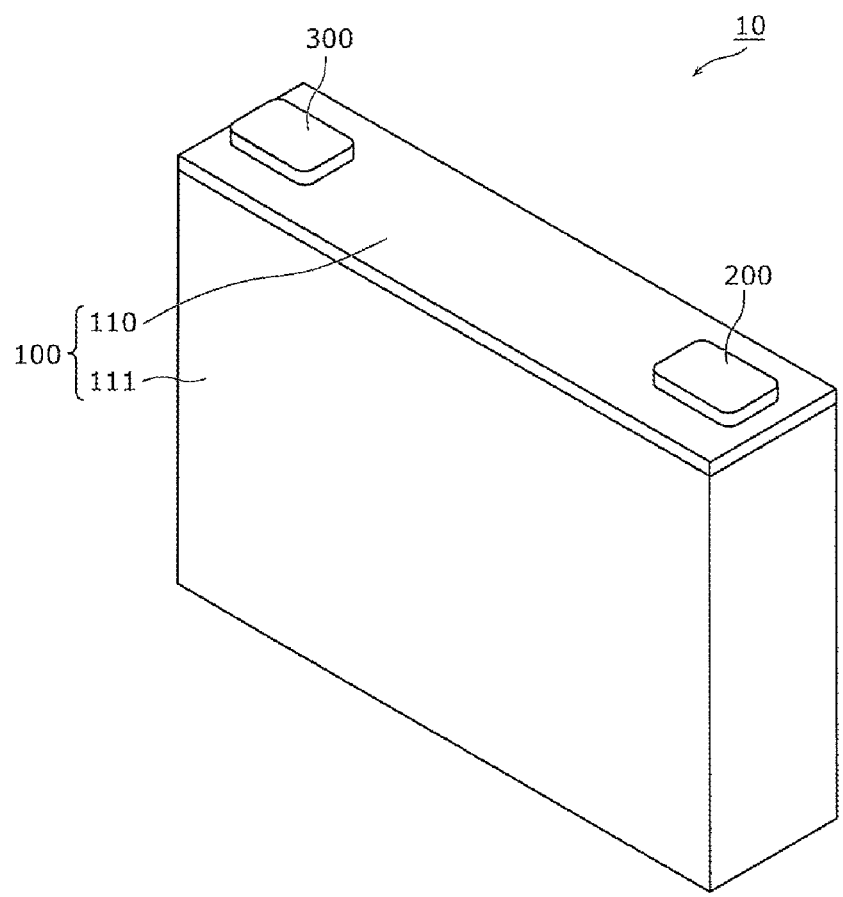
FIG. 1 is a perspective view showing an external appearance of an energy storage device according to an embodiment.

The inventors of the present application have found that the following problems arise with respect to the battery in Patent Document 1. In an electrode assembly having an electrode plate and a separator wound around a core material as in the power generating element in Patent Document 1, the core material is formed in a tubular shape with a highly flexible material such as a resin film. Therefore, when the electrode assembly is formed into a flat shape by pressing from a direction orthogonal to the winding axis, for example, the core material does not damage the electrode plate and the separator. However, since the core material has flexibility, it tends to be partially curved inward by receiving the tightening force from the separator and the electrode plate. When a part of the core material is curved inward in this way, for example, the edge on the inner peripheral side of the electrode plate may float (lift inward) from the adjacent separator on the outside of the curved part. That is, there is a possibility that a gap may be generated between the edge of the electrode plate and the separator, and if a conductive foreign substance (contamination) such as a metal piece or metal powder enters the gap, a problem such as a slight short circuit may occur.

The energy storage device according to one aspect of the present invention is an energy storage device including an electrode assembly having a tubular core material and an electrode plate and a separator wound around the core material, in which when viewed from a direction of a winding axis of the electrode assembly, the core material has a first line part and a second line part extending along a first imaginary line and a second imaginary line parallel to a long side surface of a case of the energy storage device, respectively, at least one of the first line part and the second line part has a curved portion that protrudes toward the other beyond the first imaginary line or the second imaginary line, and an inner peripheral edge of the electrode plate at a winding start position is located at a position other than the curved portion in at least one of the first line part and the second line part.

As described above, in the energy storage device according to the present aspect, in the electrode assembly having the electrode plate and the separator wound around the tubular core material, the inner peripheral edge of the electrode plate (the edge at the start of winding) is located at a position other than the curved portion of the core material. As a result, the inner peripheral edge of the electrode plate is pressed outward by the separator on the inner side (core material side), and as a result, the floating of the inner peripheral edge is suppressed. Therefore, the problem such as a slight short circuit due to contamination entering from the end portion of the electrode assembly is unlikely to occur. As described above, the energy storage device according to the present aspect is a highly reliable energy storage device.

When viewed from the direction of the winding axis, the core material has a fixed portion which is a portion where the separator is fixed in the first line part, and the curved portion may be formed adjacent to the fixed portion in the first line part.

The fixed portion in the core material is a portion that is directly pulled in the winding direction by the separator in the winding step of winding the separator and the electrode plate around the core material. Therefore, the core material tends to have a curved portion formed at a position adjacent to the fixed portion. For example, a relatively large curved portion is likely to be formed on the side of the fixed portion in the winding direction of the electrode plate and the separator. The portion other than the curved portion tends to protrude outward. Therefore, by arranging the inner peripheral edge of the electrode plate at a position avoiding the outer region of the curved portion, the suppression of the floating of the inner peripheral edge is further ensured. Before winding the separator and the electrode plate around the core material, the position of the curved portion formed after that can be easily specified with reference to the fixed portion. Therefore, it is easy to manufacture an electrode assembly in which the inner peripheral edge of the electrode plate is arranged at a position other than the curved portion in the first line part.

In the electrode assembly, the inner peripheral edge may be located in the second line part.

According to this configuration, the fixed portion is arranged in the first line part, and the inner peripheral edge of the electrode plate is arranged in the second line part. In other words, the fixed portion is arranged in one of regions divided into two by the long axis, and the inner peripheral edge of the electrode plate is arranged in the other of the regions divided into the two. Therefore, the inner peripheral edge of the electrode plate is not easily affected by the curved portion located on the side of the fixed portion. As a result, the floating of the inner peripheral edge is more reliably suppressed.

In the electrode assembly, the fixed portion and the inner peripheral edge may be arranged at positions facing each other with the winding axis interposed therebetween.

According to this configuration, the inner peripheral edge of the electrode plate exists at or near the position farthest from the fixed portion in the circumferential direction of the core material, and is therefore not easily affected by the curved portion located on the side of the fixed portion. As a result, the floating of the inner peripheral edge is more reliably suppressed.

When viewed from the direction of the winding axis, the core material may have a shape that is elongated in a predetermined direction and has a pair of curve parts facing each other in the predetermined direction, the fixed portion may be arranged on one of the pair of curve parts, and the inner peripheral edge may be arranged outside the other of the pair of curve parts.

The outside of the curve part of the core material is a portion where tension of the electrode plate and the separator (laminated elements) is easily applied at the time of winding, that is, the density of the laminated elements is high. By locating the inner peripheral edge of the electrode plate in this portion, the inner peripheral edge is firmly pressed inward by the outer separator, and the position is far also from the fixed portion, so that it is also not easily affected by the curved portion on the side of the fixed portion. As a result, the floating of the inner peripheral edge is more reliably suppressed.

The internal space of the core material is divided into two spaces by a partition wall part that crosses the internal space when viewed from the direction of the winding axis, and the fixed portion may be located outside one of the two spaces, and the inner peripheral edge may be located outside the other of the two spaces.

The curved portion formed due to the fixed portion being pulled in the winding direction is hard to be formed in the portion on the side opposite to the fixed portion with the partition wall part sandwiched by the partition wall part being pulled. Therefore, in the energy storage device according to the present aspect, the inner peripheral edge of the electrode plate is arranged at a position where the separator inside the electrode plate is hard to float, whereby the floating of the inner peripheral edge is more reliably suppressed.

The core material may be formed by winding a part of the separator. In this way, when the core material is formed by winding a part of the separator, the core material has relatively high flexibility, so that a curved portion is formed. Therefore, by arranging the inner peripheral edge of the electrode plate at a position other than the curved portion, the floating of the inner peripheral edge is suppressed. As a result, the occurrence of a problem such as a slight short circuit due to contamination is suppressed.

Hereinafter, an energy storage device according to an embodiment and a modification example of the present invention is described with reference to the drawings. Each drawing is a schematic view and is not necessarily an exact illustration.

Each of embodiments and modification examples described below shows a specific example of the present invention. However, shapes, materials, components, arrangement positions and connection modes of the components, order of manufacturing steps, and the like described in the embodiments and modification examples hereinafter are only examples and are not intended to limit the present invention. Among the components in the embodiments and modification examples described hereinafter, the components which are not described in independent claims are described as arbitrary components.

In the following embodiments, modification examples, and claims, expressions indicating relative directions or postures, such as parallel and orthogonal, may be used. Strictly speaking, these expressions also include cases where they are not in that direction or posture. For example, the fact that two directions are parallel not only means that the two directions are completely parallel, but also means that they are substantially parallel, that is, that they include a difference of, for example, about several percent.

Embodiment

1. General Description of Energy Storage Device

Figure 2:
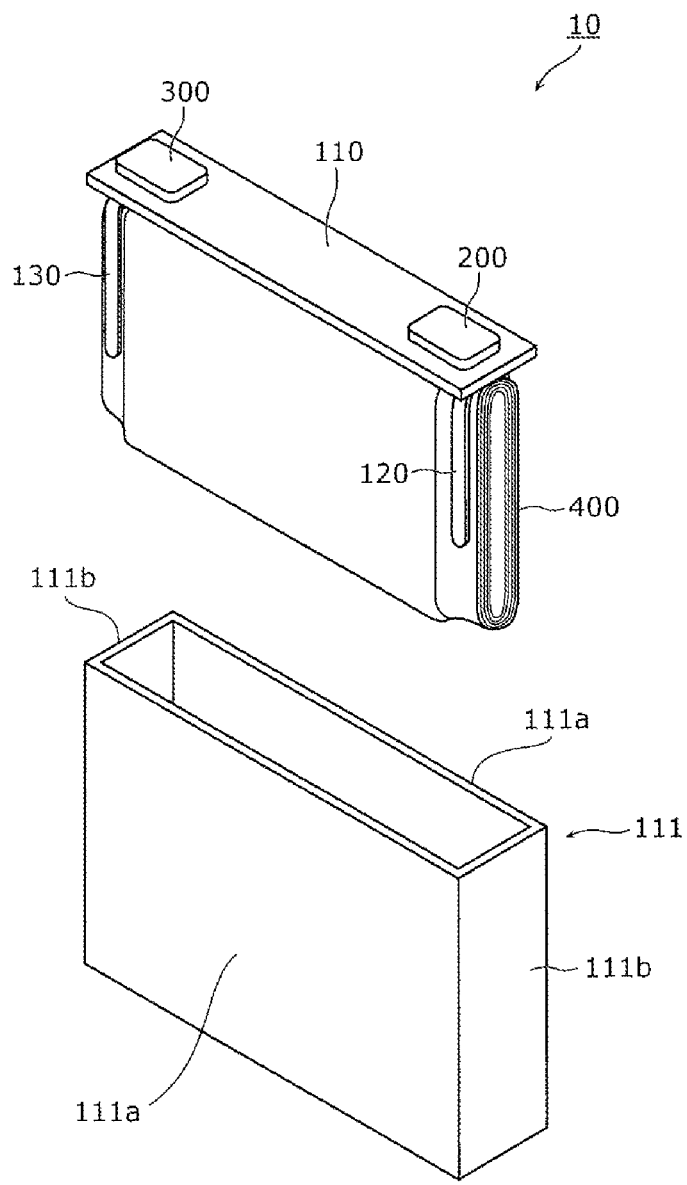
FIG. 2 is a perspective view showing components arranged in a case of the energy storage device according to the embodiment.
Figure 3:
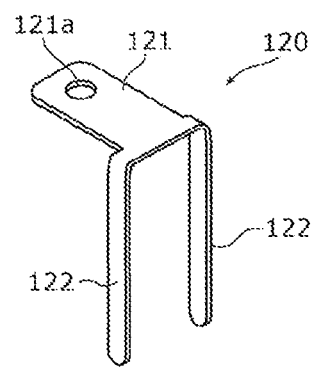
FIG. 3 is a perspective view showing an external appearance of a current collector according to the embodiment.

First, a general description of an energy storage device 10 according to an embodiment will be described with reference to FIGS. 1 to 3. FIG. 1 is a perspective view showing an external appearance of the energy storage device 10 according to the embodiment. FIG. 2 is a perspective view showing components arranged in a case 100 of the energy storage device 10 according to the embodiment. FIG. 3 is a perspective view showing an external appearance of a current collector 120 according to the embodiment.

The energy storage device 10 is a secondary battery which can charge electricity or discharge electricity, more specifically, is a nonaqueous electrolyte secondary battery such as a lithium ion secondary battery. The energy storage device 10 is applied to a power source for an automobile (or a mobile body) such as an electric vehicle (EV), a hybrid electric vehicle (HEV), or a plug-in hybrid electric vehicle (PHEV), a power source for an electronic device, or a power source for power storage. The energy storage device 10 may be mounted on a vehicle such as a gasoline vehicle and a diesel vehicle as a battery for starting the engine. The energy storage device 10 is not limited to a nonaqueous electrolyte secondary battery, and may be a secondary battery other than the nonaqueous electrolyte secondary battery or may be a capacitor. The energy storage device 10 may be a primary battery that can use electricity which is stored without the user having to charge the battery.

As shown in FIG. 1, the energy storage device 10 includes a case 100, a negative electrode terminal 200, and a positive electrode terminal 300. As shown in FIG. 2, a negative electrode-side current collector 120, a positive electrode-side current collector 130, and an electrode assembly 400 are housed inside the case 100.

In addition to the above components, the energy storage device 10 may include spacers arranged on the sides of the current collectors 120 and 130, a gas discharge valve for releasing the pressure when the pressure in the case 100 rises, or an insulating film or the like that wraps the electrode assembly 400 or the like. A liquid such as an electrolyte solution (nonaqueous electrolyte) is sealed inside the case 100 of the energy storage device 10, but the illustration of the liquid is omitted. The electrolyte solution sealed in the case 100 is not particularly limited in type as long as it does not impair the performance of the energy storage device 10, and various electrolyte solutions can be selected.

The case 100 includes a main body 111 having a rectangular tubular shape and a bottom, and a lid 110 which is a plate-shaped member that closes an opening of the main body 111. As shown in FIG. 2, the rectangular tubular main body 111 has a pair of long side surfaces 111a and a pair of short side surfaces 111b. The case 100 has a structure in which the electrode assembly 400 and the like are housed inside, and then the lid 110 and the main body 111 are, for example, welded to seal the inside. The electrode assembly 400 includes a positive electrode plate, a negative electrode plate, and a separator, and is a member capable of storing electricity. The detailed configuration of the electrode assembly 400 will be described later with reference to FIG. 4 and the like.

The negative electrode terminal 200 is an electrode terminal electrically connected to the negative electrode of the electrode assembly 400 via the current collector 120. The positive electrode terminal 300 is an electrode terminal electrically connected to the positive electrode of the electrode assembly 400 via the current collector 130. The negative electrode terminal 200 and the positive electrode terminal 300 are attached to the lid 110 arranged above the electrode assembly 400 via an insulating gasket (not shown).

The current collector 120 is arranged between the negative electrode of the electrode assembly 400 and the wall surface of the main body 111 of the case 100, and is a member having conductivity and rigidity that is electrically connected to the negative electrode terminal 200 and the negative electrode of the electrode assembly 400.

The current collector 130 is arranged between the positive electrode of the electrode assembly 400 and the wall surface of the main body 111 of the case 100, and is a member having conductivity and rigidity that is electrically connected to the positive electrode terminal 300 and the positive electrode of the electrode assembly 400.

Specifically, the current collectors 120 and 130 are fixed to the lid 110. The current collector 120 is joined to the negative electrode side end of the electrode assembly 400, and the current collector 130 is joined to the positive electrode side end of the electrode assembly 400. In the present embodiment, each of the current collectors 120 and 130 is bonded to the electrode assembly 400 by ultrasonic bonding. In the present embodiment, the shapes and mounting structures of the current collectors 120 and 130 are substantially the same. Therefore, the configuration of the current collector 120 on the negative electrode side will be described with reference to FIG. 3, and the description of the configuration of the current collector 130 on the positive electrode side will be omitted.

As shown in FIG. 3, the current collector 120 in the present embodiment has a pair of legs 122 arranged so as to sandwich the negative electrode side ends of the electrode assembly 400 from both sides. The pair of legs 122 are elongated portions extending from the end portion of a terminal connection portion 121 of the current collector 120. The terminal connection portion 121 is a portion connected to the negative electrode terminal 200. For example, the negative electrode terminal 200 and the current collector 120 are connected by caulking the rivet provided in the negative electrode terminal 200 in a state of penetrating a through hole 121a of the terminal connection portion 121. The pair of legs 122 is bonded to the negative electrode side end of the electrode assembly 400 by ultrasonic bonding. As a result, the current collector 120 is electrically connected to the negative electrode of the electrode assembly 400. As a method for bonding the electrode assembly 400 and the current collectors 120 and 130, a method such as resistance welding or clinch bonding may be adopted in addition to ultrasonic bonding.

1-1. Basic Configuration of Electrode Assembly

Figure 4:
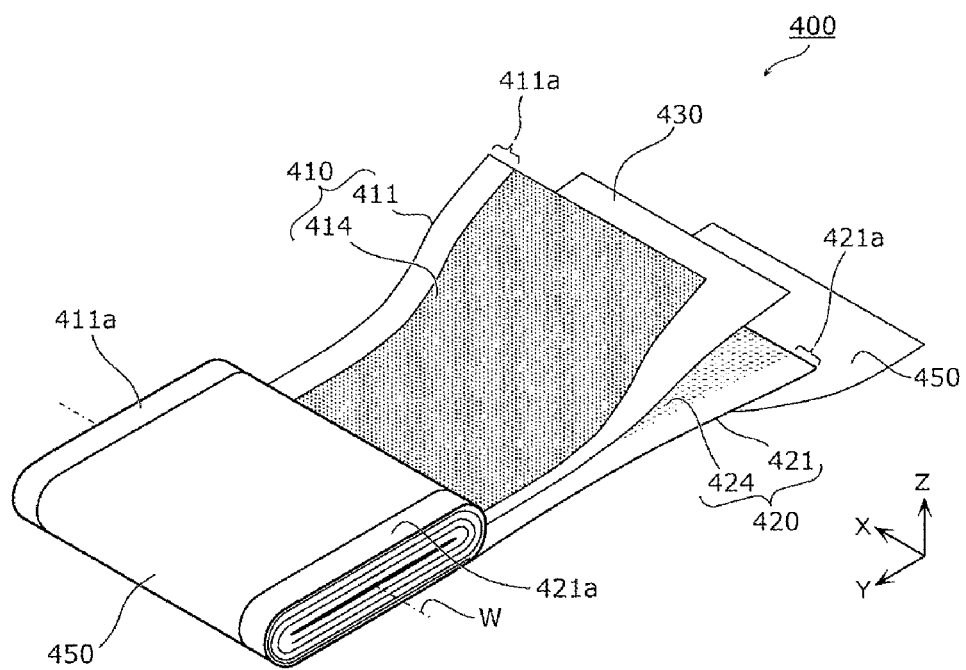
FIG. 4 is a perspective view showing an outline of a configuration of an electrode assembly according to the embodiment.

Next, the basic configuration of the electrode assembly 400 included in the energy storage device 10 configured as described above will be described with reference to FIG. 4. FIG. 4 is a perspective view showing an outline of the configuration of the electrode assembly 400 according to the embodiment. In FIG. 4, elements (laminated elements) such as electrode plates that are laminated and wound are partially developed and shown. The alternate long and short dash line with a symbol W in FIG. 4 represents the winding axis of the electrode assembly 400. The winding axis W is a imaginary axis serving as a central axis when winding the electrode plate or the like, and in the present embodiment, is a straight line parallel to the X axis passing through the center of the electrode assembly 400. That is, in the present embodiment, the "direction of the winding axis W" is synonymous with the "X-axis direction".

The electrode assembly 400 is an example of an electrode assembly formed by winding an electrode plate and a separator around a core material described later. As shown in FIG. 4, the electrode assembly 400 has a flat shape in the direction orthogonal to the winding axis W (in the present embodiment, the Z-axis direction). That is, the electrode assembly 400 has an oval shape as a whole when viewed from the direction of the winding axis W, the straight portion of the oval shape has a flat shape, and the curved portion of the oval shape has a curved shape. Therefore, the electrode assembly 400 has a pair of curved end portions facing each other (portions facing each other in the Y-axis direction with the winding axis W sandwiched) and a pair of intermediate portions (portions facing each other in the Z-axis direction with the winding axis W sandwiched) that are portions between the pair of curved end portions.

In the present embodiment, the positive electrode plate 410 includes a long strip-shaped metal foil made of aluminum (positive electrode substrate layer 411) and a positive electrode mixture layer 414 formed on the surface of the metal foil and containing a positive active material. The negative electrode plate 420 has a long strip-shaped metal foil made of copper (negative electrode substrate layer 421) and a negative electrode mixture layer 424 formed on the surface of the metal foil and containing a negative active material. In the present embodiment, the separators 430 and 450 each have a microporous sheet made of resin as a substrate.

More specifically, in the electrode assembly 400 configured as described above, the positive electrode plate 410 and the negative electrode plate 420 are wound so as to be shifted from each other in the direction of the winding axis W via the separator 430 or 450. The positive electrode plate 410 and the negative electrode plate 420 each have a mixture layer non-forming portion, which is a portion of the substrate layer in which the mixture layer is not formed, at the respective end portions in the shifted directions.

Specifically, the positive electrode plate 410 has a mixture layer non-forming portion 411a in which a positive electrode mixture layer is not formed at one end in the direction of the winding axis W (the end portion on the plus side in the X-axis direction in FIG. 4). The negative electrode plate 420 has a mixture layer non-forming portion 421a in which a negative electrode mixture layer is not formed at the other end in the direction of the winding axis W (the end portion on the minus side in the X-axis direction in FIG. 4).

That is, the positive electrode side end is formed by the layer of the exposed metal foil (mixture layer non-forming portion 411a) of the positive electrode plate 410, and the negative electrode side end is formed by the layer of the exposed metal foil (mixture layer non-forming portion 421a) of the negative electrode plate 420. The positive electrode side end is joined to the current collector 130, and the negative electrode side end is joined to the current collector 120.

1-2. Core Material and Surrounding Structure

In the electrode assembly 400 configured as described above, the edge at the start of winding of the electrode plate (in the present embodiment, the inner peripheral edge of the negative electrode plate 420) is arranged at a position different from the outer region of the curved portion of the core material. As a result, the floating of the inner peripheral edge is suppressed. This structure will be described below with reference to FIGS. 5 to 8.

Figure 5:
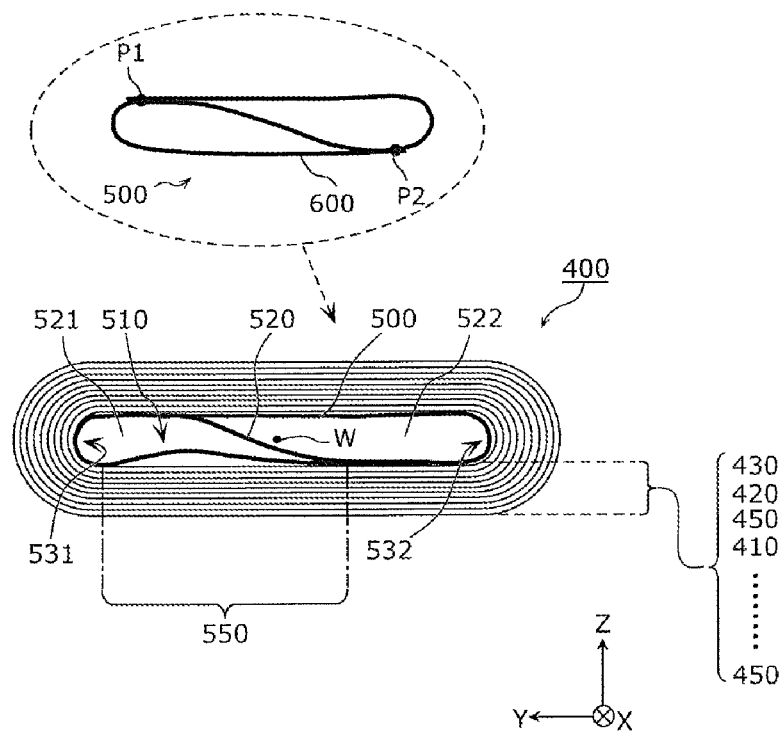
FIG. 5 is a diagram showing an outline of a configuration when the electrode assembly according to the embodiment is viewed from a direction of a winding axis.
Figure 6:
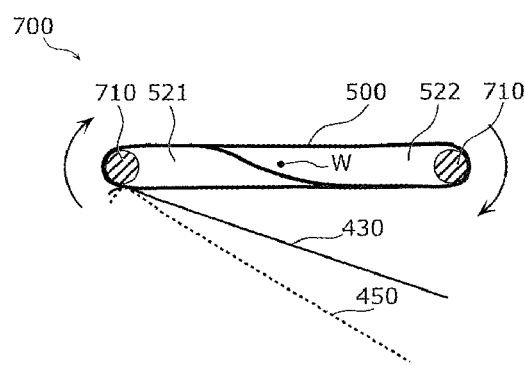
FIG. 6 is a diagram simply showing a method of manufacturing the electrode assembly according to the embodiment.
Figure 7:
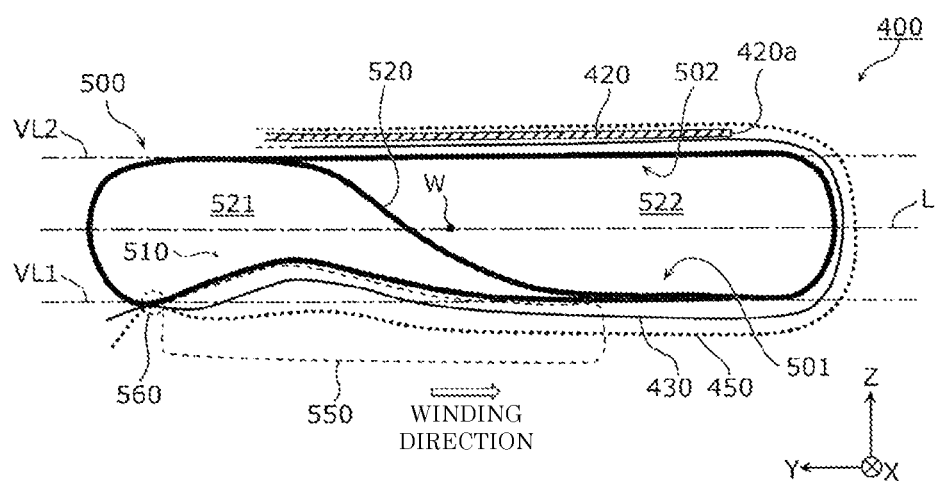
FIG. 7 is a diagram showing an outline of a configuration of a core material of the electrode assembly and its surroundings according to the embodiment.
Figure 8:
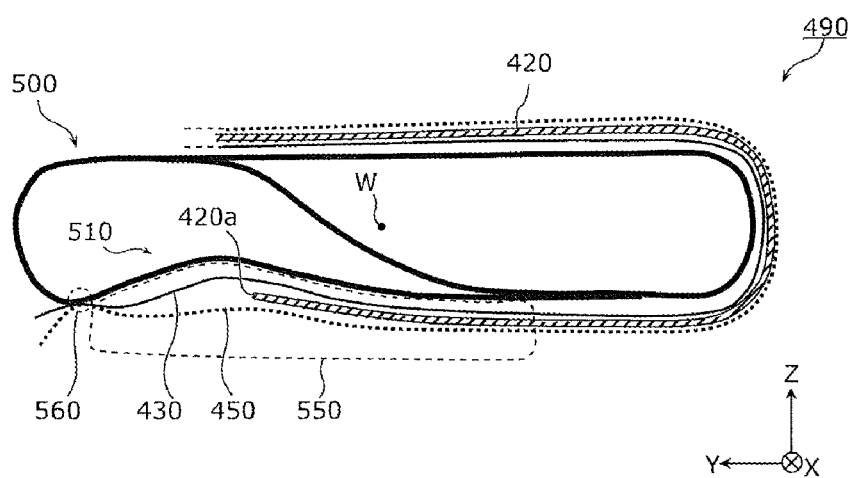
FIG. 8 is a diagram showing an outline of a configuration of an electrode assembly according to a comparative example.

FIG. 5 is a diagram showing an outline of the configuration when the electrode assembly 400 according to the embodiment is viewed from the direction of the winding axis W. FIG. 6 is a diagram simply showing a method of manufacturing the electrode assembly 400 according to the embodiment. FIG. 7 is a diagram showing an outline of the configuration of a core material 500 of the electrode assembly 400 and its surroundings according to the embodiment. FIG. 8 is a diagram showing an outline of a configuration of an electrode assembly 490 according to a comparative example.

In FIG. 6, the separators 430 and 450 that are first wound around the core material 500 are shown, and the illustration of the negative electrode plate 420 and the positive electrode plate 410 that are wound while being sandwiched between the separators 430 and 450 is omitted. In FIGS. 7 and 8, only a part of the winding start of each of the negative electrode plate 420 and, the separators 430 and 450 is shown, and the illustration of the positive electrode plate 410 is omitted. In FIGS. 6 to 8, the separator 430 is represented by a solid line and the separator 450 is represented by a dotted line so that the separator 430 and the separator 450 can be easily distinguished. These supplementary items regarding FIGS. 6 to 8 also apply to FIGS. 9 and 10 described later.

As shown in FIG. 5, the electrode assembly 400 according to the present embodiment has an oval shape that is flat in the Z-axis direction when viewed from the direction of the winding axis W. Such a shape is formed by winding an element constituting the electrode assembly 400 (hereinafter, also referred to as a "laminated element") such as a negative electrode plate 420 and then compressing the element in the Z-axis direction.

In the present embodiment, the electrode assembly 400 has the core material 500, and the core material 500 also has a roughly flat shape in the Z-axis direction. As shown in FIG. 7, the core material 500 has a first line part 501 extending along a first imaginary line VL1 and a second line part 502 extending along a second imaginary line VL2. The first imaginary line VL1 and the second imaginary line VL2 are imaginary lines parallel to the long side surface 111a (see FIG. 2) of the case 100 of the energy storage device 10. More specifically, the first imaginary line VL1 and the second imaginary line VL2 are parallel to the long side surface 111a and, when viewed from the direction of the winding axis W, are a pair of imaginary straight lines passing through both end portions of the core material 500 in the thickness direction (Z-axis direction).

In the present embodiment, as the core material 500, a core material 500 formed in a tubular shape by winding a resin sheet 600 made of polypropylene, polyethylene or the like is adopted. That is, the core material 500 is a member having relatively high flexibility. Therefore, when the electrode assembly 400 is pressed in the Z-axis direction as described above, the core material 500 is flattened according to the pressing force without damaging the laminated elements such as the separator 430 around the core material 500. That is, the core material 500 is formed in a shape that is elongated in the Y-axis direction and has a pair of curve parts 531 and 532 that face each other in the Y-axis direction when viewed from the direction of the winding axis W.

More specifically, when the core material 500 according to the present embodiment is manufactured, the winding start portion of the resin sheet 600 is formed into an S shape, and as shown in FIG. 5, for example, two places P1 and P2 are welded. Further, the resin sheet 600 is wound around the S-shaped portion. As a result, the core material 500 is formed with a partition wall part 520 that crosses the internal space when viewed from the direction of the winding axis W. That is, as shown in FIG. 5, the internal space of the tubular core material 500 is divided into a first hollow portion 521 and a second hollow portion 522 by the partition wall part 520.

In the drawings after FIG. 5, the core material 500 is formed by winding the resin sheet 600 about one and a half turns, but the number of turns of the resin sheet 600 forming the core material 500 is not particularly limited. For example, the core material 500 may be formed by winding the resin sheet 600 around the S-shaped portion for one or more turns. It is not essential that the core material 500 is formed by winding the resin sheet 600 one or more turns. For example, a cylinder is manufactured by resin molding using a mold, and the cylinder may be adopted as the core material 500.

When a laminated element such as a separator 430 is wound around the core material 500 formed in this way, a part of the highly flexible core material 500 is curved inward by the tension of the laminated element. As a result, the core material 500 is formed with a curved portion 510 as shown in FIG. 5.

Specifically, in the step of winding the laminated element such as the separator 430 around the core material 500 (winding step), a winding device 700 for rotating the core material 500 is used. As shown in FIG. 6, the winding device 700 has a pair of support members 710 for rotating the core material 500. That is, the core material 500 is supported by the support member 710 inserted into the first hollow portion 521 and the support member 710 inserted into the second hollow portion 522, and is rotated around the winding axis W in that state. As shown in FIG. 6, the end portions of the separators 430 and 450 are fixed to the core material 500 by a predetermined method such as welding, and the rotation of the core material 500 is started in this state. After that, the negative electrode plate 420 is sandwiched outside the separator 430 and inside the separator 450, and the positive electrode plate 410 is sandwiched outside the separator 450 and inside the separator 430. As a result, the electrode assembly 400 in which the separator 430, the negative electrode plate 420, the separator 450, and the positive electrode plate 410 are wound around the core material 500 can be obtained.

In FIG. 7, only one layer of the separator 430 is arranged inside the negative electrode plate 420 (the side closer to the core material 500), but inside the negative electrode plate 420, a multi-layer separator 430 wound around the core material 500 may be arranged. Inside the negative electrode plate 420, the separators 430 and 450 may be wound around the core material 500 in a state of being overlapped with each other.

In the above winding step, the core material 500 is supported by the support members 710 at both ends in the longitudinal direction (horizontal direction in FIG. 6), and at this point, the curved portion 510 does not exist clearly in the core material 500. However, when the pair of support members 710 are subsequently removed from the core material 500 around which the separator 430 and the like are wound, the core material 500 is partially curved inward due to the force received from the laminated elements such as the separator 430. As a result, the curved portion 510 is formed.

More specifically, as shown in FIG. 7, the core material 500 has a fixed portion 560 to which the separators 430 and 450 are fixed, and in the winding step, the fixed portion 560 is in a state of being pulled in the winding direction (rightward in FIG. 7). When the pair of support members 710 is removed from the core material 500 in that state, the fixed portion 560 is in a state in which the side of the fixed portion 560 in the winding direction is easy to curve due to the tension of the separators 430 and 450 acting on the fixed portion 560. Further, a tightening force due to a laminated element such as a separator 430 wound around the core material 500 acts on the core material 500, and as a result, a curved portion 510 is formed on the side of the fixed portion 560 in the winding direction. In the present embodiment, the first line part 501 of the core material 500 is formed with the curved portion 510 that protrudes toward the second imaginary line VL2 beyond the first imaginary line VL1. The curved portion 510 is formed adjacent to the fixed portion 560 in the first line part 501. Even when the electrode assembly 400 on which the curved portion 510 is formed is pressed in the Z-axis direction, the curved portion 510 is not straightened flat, and the curved portion 510 remains on the core material 500, and the current collectors 120 and 130 (see FIGS. 1 and 2) are joined to the electrode assembly 400 and housed in the case 100 (see FIG. 2).

In this way, when the curved portion 510 exists in the core material 500, the separators 430 and 450 can move inward in the region immediately outside the curved portion 510 (outer region 550), whereby a gap is likely to be formed between the separators 430 and 450.

Therefore, when the inner peripheral edge 420a of the negative electrode plate 420 is arranged in the outer region 550 as in the electrode assembly 490 according to the comparative example shown in FIG. 8, the inner peripheral edge 420a tends to float from the adjacent separator 450. A gap is likely to be generated also between the inner peripheral edge 420a and the adjacent separator 430. In this case, for example, there is a high possibility that the following problem occurs. That is, for example, fine metal powder (contamination) generated at the time of joining the current collector 120 and the electrode assembly 400 enters from the end portion of the electrode assembly 400 and is ionized, and comes into contact with the negative electrode plate 420. As a result, a dendrite is formed on the negative electrode plate 420, and the dendrite penetrates the separator 450 to cause a slight short circuit between the positive electrode plate 410 and the negative electrode plate 420.

Therefore, in the present embodiment, as shown in FIG. 7, a configuration is adopted in which the inner peripheral edge 420a at the winding start position of the negative electrode plate 420 is arranged at a position other than the curved portion 510 of the core material 500. Specifically, a configuration is adopted in which the inner peripheral edge 420a is not arranged in the outer region 550 of the curved portion 510 of the core material 500.

That is, the energy storage device 10 according to the present embodiment includes a tubular core material 500, and an electrode assembly 400 having an electrode plate and a separator wound around the core material 500. When viewed from the direction of the winding axis W of the electrode assembly 400, the core material 500 has a first line part 501 and a second line part 502 extending along a first imaginary line VL1 and a second imaginary line VL2 parallel to the long side surface 111a of the case 100, respectively. At least one of the first line part 501 and the second line part 502 has a curved portion 510 that protrudes toward the other beyond the first imaginary line VL1 or the second imaginary line VL2. The inner peripheral edge 420a of the negative electrode plate 420 at the winding start position is located at a position other than the curved portion 510 in at least one of the first line part 501 and the second line part 502. In the present embodiment, the first line part 501 has a curved portion 510 that protrudes toward the second imaginary line VL2 beyond the first imaginary line VL1. The inner peripheral edge 420a is arranged at a position other than the curved portion 510 in the first line part 501.

Specifically, in the electrode assembly 400 according to the present embodiment, as illustrated in FIG. 7, the negative electrode plate 420 and the separator 430 are wound around the tubular core material 500 with the separator 430 inside. In this electrode assembly 400, the inner peripheral edge 420a of the negative electrode plate 420 is not located in the outer region 550 of the curved portion 510 of the core material 500. That is, the inner peripheral edge 420a is arranged at a position other than the curved portion 510, whereby the inner peripheral edge 420a of the negative electrode plate 420 is pressed outward by the separator 430 on the inner side (core material 500 side). As a result, the floating of the inner peripheral edge 420a is suppressed. That is, the end portion of the negative electrode plate 420 including the inner peripheral edge 420a is sandwiched between the separators 430 and 450 from both sides, and the problem such as a slight short circuit due to contamination entering from the end portion of the electrode assembly 400 is hard to occur. Therefore, the energy storage device 10 according to the present embodiment is a highly reliable energy storage device.

In the present embodiment, when viewed from the direction of the winding axis W, the core material 500 has a fixed portion 560, which is a portion to which the separator 430 is fixed, in the first line part 501. The curved portion 510 is formed adjacent to the fixed portion 560 in the first line part 501. In the present embodiment, the end portions of the separators 430 and 450 are fixed to the fixed portion 560 by heat welding or the like.

As described above, the fixed portion 560 in the core material 500 is a portion that is directly pulled in the winding direction by the separators 430 and 450 in the winding step. Therefore, in the core material 500, the curved portion 510 is likely to be formed at a position adjacent to the fixed portion 560. For example, a relatively large curved portion 510 is likely to be formed on the side of the fixed portion 560 in the winding direction of the negative electrode plate 420 and the separator 430. The portion other than the curved portion 510 tends to be in a state of protruding outward. Therefore, by arranging the inner peripheral edge 420a of the negative electrode plate 420 at a position avoiding the outer region 550 of the curved portion 510, the suppression of the floating of the inner peripheral edge 420a is further ensured. For example, before starting the winding step, the position of the curved portion 510 formed after that can be easily specified with reference to the fixed portion 560. Therefore, it is easy to manufacture the electrode assembly 400 in which the inner peripheral edge 420a of the negative electrode plate 420 is arranged at a position other than the curved portion 510.

In the energy storage device 10 according to the present embodiment, the inner peripheral edge 420a is located at the second line part 502.

As described above, in the present embodiment, the fixed portion 560 is arranged in the first line part 501, and the inner peripheral edge 420a of the negative electrode plate 420 is arranged in the second line part 502. In other words, the fixed portion 560 is arranged in one of the regions divided into two by the long axis L, and the inner peripheral edge 420a of the negative electrode plate 420 is arranged in the other of the regions divided into the two. (See FIG. 7). Therefore, the inner peripheral edge 420a of the negative electrode plate 420 is not easily affected by the curved portion 510 located on the side of the fixed portion 560. As a result, the floating of the inner peripheral edge 420a is more reliably suppressed.

In the energy storage device 10 according to the present embodiment, in the electrode assembly 400, the fixed portion 560 and the inner peripheral edge 420a are arranged at positions facing each other with the winding axis W interposed therebetween. That is, when the electrode assembly 400 is viewed from the direction of the winding axis W, the inner peripheral edge 420a of the negative electrode plate 420 is located on or near the straight line passing through the fixed portion 560 and the winding axis W.

That is, in the present embodiment, the inner peripheral edge 420a of the negative electrode plate 420 exists at a position farthest from the fixed portion 560 or its vicinity in the circumferential direction of the core material 500, and is therefore not easily affected by the curved portion 510 located on the side of the fixed portion 560. As a result, the floating of the inner peripheral edge 420a is more reliably suppressed.

In the energy storage device 10 according to the present embodiment, the internal space of the core material 500 is divided into two spaces by a partition wall part 520 that crosses the internal space when viewed from the direction of the winding axis W. The fixed portion 560 is located outside one of the two spaces, and the inner peripheral edge 420a is located outside the other of the two spaces. More specifically, as shown in FIG. 7, for example, the internal space of the core material 500 is divided into a first hollow portion 521 and a second hollow portion 522 by the partition wall part 520. The fixed portion 560 is located outside the first hollow portion 521, and the inner peripheral edge 420a is located outside the second hollow portion 522.

The curved portion 510 formed due to the fixed portion 560 being pulled in the winding direction (see FIG. 7) is hard to be formed at a portion opposite to the fixed portion 560 with the partition wall part 520 sandwiched by the partition wall part 520 being pulled. Therefore, according to the energy storage device 10 according to the present embodiment, the inner peripheral edge 420a of the negative electrode plate 420 is arranged at a position where the separator 430 inside the negative electrode plate 420 is hard to float. As a result, the floating of the inner peripheral edge 420a is more reliably suppressed.

Although the energy storage device 10 according to the embodiment has been described above, the configuration of the electrode assembly 400 included in the energy storage device 10 may be different from the configuration shown in FIGS. 5 to 7. Therefore, a modification example of the configuration of the electrode assembly 400 will be described below, focusing on the difference from the above embodiment.

First Modification Example

Figure 9:
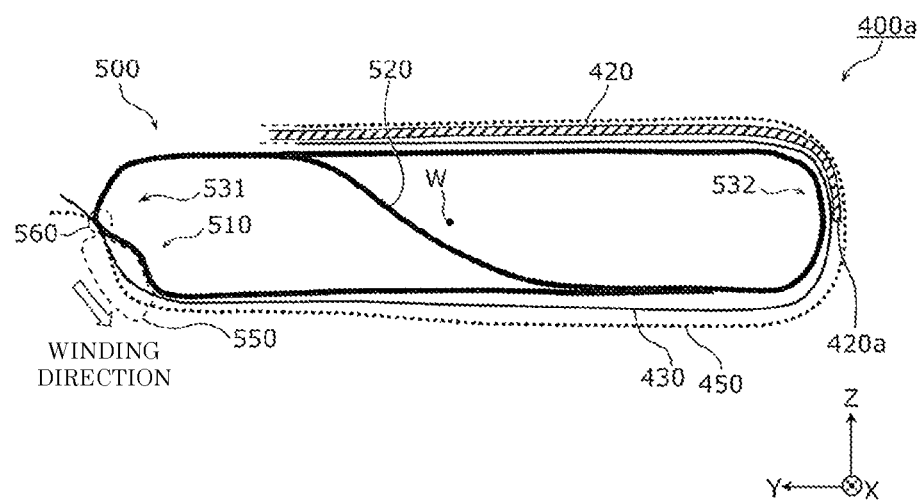
FIG. 9 is a diagram showing an outline of a configuration of a core material of an electrode assembly and its surroundings according to a first modification example of the embodiment.

FIG. 9 is a diagram showing an outline of a configuration of a core material 500 of an electrode assembly 400a and its surroundings according to the first modification of the embodiment. In the electrode assembly 400a shown in FIG. 9, a fixed portion 560 and an inner peripheral edge 420a of a negative electrode plate 420 are arranged at positions facing each other in the longitudinal direction (Y-axis direction) of the core material 500 when viewed from the direction of the winding axis W.

That is, in the energy storage device 10 according to this modification example, the core material 500 is elongated in a predetermined direction (Y-axis direction in this modification example) when viewed from the direction of the winding axis W, and has a shape having a pair of curve parts 531 and 532 facing each other in the Y-axis direction. The fixed portion 560 is arranged on one of the pair of curve parts 531 and 532, and the inner peripheral edge 420a is arranged outside the other of the pair of curve parts 531 and 532. In the example shown in FIG. 9, the fixed portion 560 is arranged on the curve part 531 of the core material 500, and the inner peripheral edge 420a is arranged outside the curve part 532.

In the core material 500 formed in an oval shape when viewed from the direction of the winding axis W, tension of laminated elements such as the separator 430 is likely to be applied to the outside of each of the curve parts 531 and 532 during winding. That is, the outside of each of the curve parts 531 and 532 is a portion where the density of the laminated elements is high. Therefore, since the inner peripheral edge 420a of the negative electrode plate 420 is located in this portion, the inner peripheral edge 420a is firmly pressed inward by the outer separator 450, and since it is also located far from the fixed portion 560, it is not easily affected by the curved portion 510 on the side of the fixed portion 560. As a result, the floating of the inner peripheral edge 420a is more reliably suppressed. As a result, the occurrence of a problem such as a slight short circuit due to contamination is suppressed.

Second Modification Example

Figure 10:
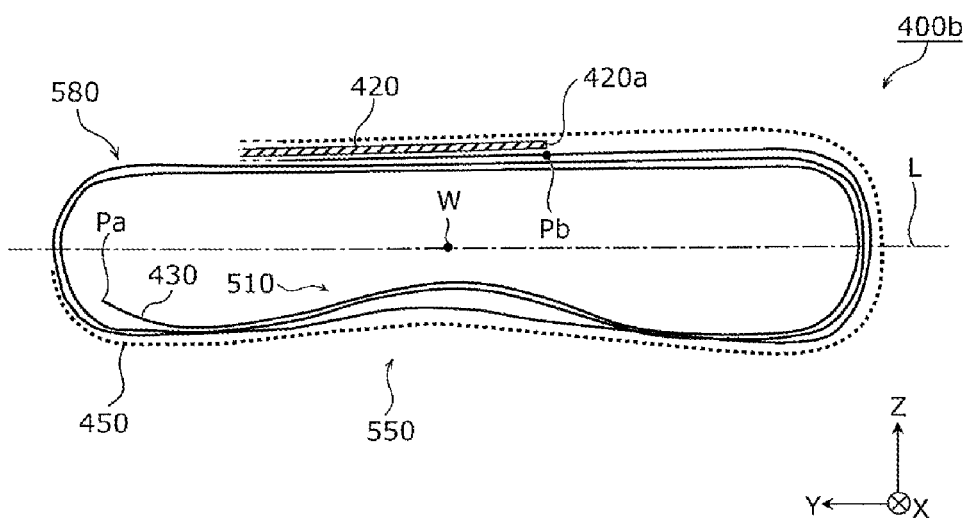
FIG. 10 is a diagram showing an outline of a configuration of a core material of an electrode assembly and its surroundings according to a second modification example of the embodiment.

FIG. 10 is a diagram showing an outline of a configuration of an electrode assembly 400b according to the second modification example of the embodiment. In the electrode assembly 400b according to the present modification example, unlike the electrode assembly 400 according to the above embodiment, a core material 580 is formed by a part of the laminated elements. Specifically, as shown in FIG. 10, the core material 580 is formed by winding a part of a separator 430. That is, the electrode assembly 400b is formed by winding a negative electrode plate 420, a separator 450, a positive electrode plate 410, and a remaining portion of the separator 430 around an outer circumference of the core material 580 formed by a part of the separator 430.

When the core material is formed by a part of the separator, for example, a portion from the edge at the start of winding of the separator to the lateral position (electrode plate start position) of the inner peripheral edge may be defined as "core material". That is, in the case of the present modification example, as shown in FIG. 10, a portion around which the separator 430 is wound, which is a portion from the innermost peripheral edge Pa to an electrode plate start position Pb, can be treated as the core material 580.

In this way, even when the core material 580 is formed by winding the separator 430, the curved portion 510 is formed because the core material 580 has relatively high flexibility. That is, when a pair of support members 710 is removed from the core material 580 after the winding step using the winding device 700 (see FIG. 6), the core material 580 is partially curved inside due to the force received from the laminated elements. As a result, the curved portion 510 is formed. Therefore, by arranging the inner peripheral edge 420a of the negative electrode plate 420 at a position other than the curved portion 510 (in FIG. 10, a position different from the outer region 550 of the curved portion 510 in the radial direction of the core material 580), the floating of the inner peripheral edge 420a is suppressed. As a result, the occurrence of a problem such as a slight short circuit due to contamination is suppressed.

In the example shown in FIG. 10, the core material 580 is formed only by the separator 430, but for example, the core material 580 may be formed by winding the separators 430 and 450 in layers. The winding start end of the separator 450 may be fixed to the core material 580 formed of the separator 430 having one or more layers inside the separator 450 by welding or the like. In this case, the portion of the core material 580 to which the separator 450 is fixed is the fixed portion of the core material 580, and the curved portion 510 is formed adjacent to the fixed portion.

Other Embodiments

The energy storage device according to the present invention has been described above based on the embodiments and modification examples. However, the present invention is not limited to the above-mentioned embodiments and modification examples. As long as the gist of the present invention is not deviated, various modification examples that can be conceived by those skilled in the art are applied to the above-described embodiment or modification example, or a form constructed by combining the plurality of components described above is also included within the range of the present invention.

For example, in the embodiments and modification examples, focusing on the negative electrode plate 420 arranged on the inner peripheral side of the negative electrode plate 420 and the positive electrode plate 410, that the inner peripheral edge 420a of the negative electrode plate 420 is arranged at a portion other than the curved portion 510 (for example, the position different from the outer region 550, the same applies hereinafter) and its effect have been described. However, in addition to or in place of the inner peripheral edge 420a of the negative electrode plate 420, the inner peripheral edge of the positive electrode plate 410 may be arranged at a position other than the curved portion 510. As a result, a gap is hard to be generated in the vicinity of the inner peripheral edge of the positive electrode plate 410, and as a result, the occurrence of the problem such as a slight short circuit due to contamination is suppressed.

In the core material 500 according to the embodiment, the partition wall part 520 is not essential. For example, by simply winding the resin sheet 600, a tubular core material 500 having no wall that crosses the internal space may be formed.

For example, when the position of the fixed portion 560 on the core material 500 is the position shown in FIG. 7, the position of the inner peripheral edge 420a of the negative electrode plate 420 does not have to be the position shown in FIG. 7. For example, in the core material 500, the position of the fixed portion 560 and the position of the inner peripheral edge 420a may exist in the same side region when the long axis L is referred to (for example, the region below the long axis L in FIG. 7). Even in this case, since the inner peripheral edge 420a is arranged at a position other than the curved portion 510, the floating of the inner peripheral edge 420a is suppressed.

In the present embodiment, the energy storage device 10 includes only one electrode assembly 400, but the number of electrode assemblies 400 included in the energy storage device 10 may be two or more. For example, when the energy storage device 10 includes two electrode assemblies 400, the current collector 120 may have four legs 122 joined to the two electrode assemblies 400.

Forms which are constructed by arbitrarily combining the configurations described in the above-mentioned embodiments are also included in the scope of the present invention.

The present invention can be realized not only as the energy storage device described above, but also as the electrode assembly 400 included in the energy storage device. The present invention can also be realized as an energy storage apparatus including a plurality of the energy storage devices.

INDUSTRIAL APPLICABILITY

The present invention can be applied to an energy storage device or the like such as a lithium ion secondary battery.

DESCRIPTION OF REFERENCE SIGNS

10: energy storage device
100: case
111a: long side surface
400, 400a, 400b: electrode assembly
410: positive electrode plate
420: negative electrode plate
420a: inner peripheral edge
430, 450: separator
500, 580: core material
501: first line part
502: second line part
510: curved portion
520: partition wall part
521: first hollow portion
522: second hollow portion
531, 532: curve part
550: outer region
560: fixed portion

The invention claimed is:

1. An energy storage device comprising an electrode assembly including a tubular core material and an electrode plate and a separator wound around the tubular core material, wherein:
when viewed from a direction of a winding axis of the electrode assembly, the tubular core material includes a first line part and a second line part extending along a first imaginary line and a second imaginary line parallel to a long side surface of a case of the energy storage device, respectively;
the first line part includes a curved portion that protrudes toward the second line part beyond the first imaginary line;
the second line part includes no curved portion that protrudes toward the first line part; and
an inner peripheral edge of the electrode plate at a winding start position is located at the second line part.

2. The energy storage device according to claim 1, wherein
the core material has a fixed portion, which is a portion to which the separator is fixed, in the first line part when viewed from the direction of the winding axis, and
the curved portion is formed adjacent to the fixed portion in the first line part.

3. The energy storage device according to claim 2, wherein in the electrode assembly, the inner peripheral edge is located at the second line part.

4. The energy storage device according to claim 2, wherein in the electrode assembly, the fixed portion and the inner peripheral edge are arranged at positions facing each other with the winding axis interposed therebetween.

5. The energy storage device according to claim 1, wherein
an internal space of the core material is divided into two spaces by a partition wall part that crosses the internal space when viewed from the direction of the winding axis;
the fixed portion is located outside one of the two spaces; and
the inner peripheral edge is located outside an other of the two spaces.

6. The energy storage device according to claim 1, wherein the core material is formed by winding a part of the separator.

7. The energy storage device according to claim 1, wherein the separator includes:
a first separator arranged between the inner peripheral edge of the electrode plate and the tubular core material; and
a second separator adjacent to the inner peripheral edge of the electrode plate and arranged outside compared with the first separator; and
the inner peripheral edge of the electrode plate is interposed between the first separator and the second separator.

8. The energy storage device according to claim 1, wherein at least one of the first line part and the second line part includes a curved portion that is integrally formed by partially protruding at least one of the first line part and the second line part protrudes toward an other of the first line part and the second line part beyond the first imaginary line or the second imaginary line.

9. The energy storage device according to claim 1, wherein the separator includes:
a first separator arranged between the inner peripheral edge of the electrode plate and the tubular core material; and
a second separator adjacent to the inner peripheral edge of the electrode plate and arranged outside compared with the first separator; and
the inner peripheral edge of the electrode plate is interposed between the first separator and the second separator,
wherein at least one of the first line part and the second line part includes a curved portion that is integrally formed by partially protruding at least one of the first line part and the second line part protrudes toward an other of the first line part and the second line part beyond the first imaginary line or the second imaginary line.

10. An energy storage device comprising an electrode assembly including a tubular core material and an electrode plate and a separator wound around the tubular core material, wherein:
   when viewed from a direction of a winding axis of the electrode assembly, the tubular core material includes a first line part and a second line part extending along a first imaginary line and a second imaginary line parallel to a long side surface of a case of the energy storage device, respectively;
   at least one of the first line part and the second line part includes a curved portion that protrudes toward an other of the first line part and the second line part beyond the first imaginary line or the second imaginary line; and
   an inner peripheral edge of the electrode plate at a winding start position is located at a position other than the curved portion in at least one of the first line part and the second line part; and
   the separator includes:
      a first separator arranged between the inner peripheral edge of the electrode plate and the tubular core material; and
      a second separator adjacent to the inner peripheral edge of the electrode plate and arranged outside compared with the first separator; and
   the inner peripheral edge of the electrode plate is interposed between the first separator and the second separator.

11. The energy storage device according to claim 10, wherein at least one of the first line part and the second line part includes a curved portion that is integrally formed by partially protruding at least one of the first line part and the second line part protrudes toward an other of the first line part and the second line part beyond the first imaginary line or the second imaginary line.

12. The energy storage device according to claim 10, wherein
   the core material has a fixed portion, which is a portion to which the separator is fixed, in the first line part when viewed from the direction of the winding axis, and
   the curved portion is formed adjacent to the fixed portion in the first line part.

13. The energy storage device according to claim 12, wherein in the electrode assembly, the inner peripheral edge is located at the second line part.

14. The energy storage device according to claim 12, wherein in the electrode assembly, the fixed portion and the inner peripheral edge are arranged at positions facing each other with the winding axis interposed therebetween.

15. The energy storage device according to claim 10, wherein
   an internal space of the core material is divided into two spaces by a partition wall part that crosses the internal space when viewed from the direction of the winding axis;
   the fixed portion is located outside one of the two spaces; and
   the inner peripheral edge is located outside an other of the two spaces.

16. The energy storage device according to claim 10, wherein the core material is formed by winding a part of the separator.

17. An energy storage device comprising an electrode assembly including a tubular core material and an electrode plate and a separator wound around the tubular core material, wherein:
   when viewed from a direction of a winding axis of the electrode assembly, the tubular core material includes a first line part and a second line part extending along a first imaginary line and a second imaginary line parallel to a long side surface of a case of the energy storage device, respectively;
   at least one of the first line part and the second line part includes a curved portion that is integrally formed by partially protruding at least one of the first line part and the second line part toward an other of the first line part and the second line part beyond the first imaginary line or the second imaginary line; and
   an inner peripheral edge of the electrode plate at a winding start position is located at a position other than the curved portion in at least one of the first line part and the second line part.

18. The energy storage device according to claim 17, wherein
   the core material has a fixed portion, which is a portion to which the separator is fixed, in the first line part when viewed from the direction of the winding axis, and
   the curved portion is formed adjacent to the fixed portion in the first line part.

19. The energy storage device according to claim 18, wherein in the electrode assembly, the inner peripheral edge is located at the second line part.

* * * * *